US008559368B2

(12) United States Patent
Isonuma et al.

(10) Patent No.: US 8,559,368 B2
(45) Date of Patent: Oct. 15, 2013

(54) WIRELESS COMMUNICATION SYSTEM, MOBILE STATION, WIRELESS BASE STATION AND COMMUNICATION METHOD

(75) Inventors: Yutaka Isonuma, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 12/547,752

(22) Filed: Aug. 26, 2009

(65) Prior Publication Data

US 2010/0067466 A1 Mar. 18, 2010

(30) Foreign Application Priority Data

Sep. 18, 2008 (JP) .................................. 2008-238894

(51) Int. Cl.
*H04W 4/00* (2009.01)
(52) U.S. Cl.
USPC ......................................................... 370/328
(58) Field of Classification Search
None
See application file for complete search history.

(56) References Cited

U.S. PATENT DOCUMENTS

| | | | | |
|---|---|---|---|---|
| 6,363,255 | B1 * | 3/2002 | Kuwahara | 455/456.5 |
| 6,452,912 | B1 * | 9/2002 | Leem | 370/335 |
| 7,016,680 | B2 * | 3/2006 | Yagi | 455/441 |
| 7,756,522 | B2 * | 7/2010 | Nomiya et al. | 455/453 |
| 2004/0185874 | A1 | 9/2004 | Kim et al. | |
| 2005/0070283 | A1 | 3/2005 | Hashimoto et al. | |
| 2008/0280594 | A1 * | 11/2008 | Voyer et al. | 455/412.1 |

FOREIGN PATENT DOCUMENTS

| | | |
|---|---|---|
| JP | 10-023519 | 1/1998 |
| JP | 2004-274767 | 9/2004 |
| JP | 2005-109570 | 4/2005 |
| JP | 2006-261722 | 9/2006 |

OTHER PUBLICATIONS

Bhatt et al.; "A method for interference control and power saving for home access point"; Nokia Siemens Networks 2007; IP COM Journal; Dec. 13, 2007, pp. 1-3.
Mitsubishi Electric; "Dynamic Setup of HNBs for Energy Savings and Interference Reduction"; Agenda Item: 10.1.1c; 3GPP TSG RAN WG3 Meeting #59bis; R3-080658; Shenzhen, China; Mar. 31-Apr. 3, 2008.
Notification of Reason for Refusal issued for corresponding Japanese Application No. 2008-238894, dated May 7, 2013, with partial English translation.

* cited by examiner

*Primary Examiner* — Kevin C Harper
*Assistant Examiner* — Samina Choudhry
(74) *Attorney, Agent, or Firm* — Myers Wolin, LLC

(57) ABSTRACT

A wireless communication system having a plurality of wireless base stations (BSs), and a second BS included under at least one of a first BS among the plurality of BSs and usable by a specified mobile station, the wireless communication system includes registering first identifiers as identifiers of the first BS and a second identifier as an identifier of the second BS in the specified mobile station in advance. The wireless communication system includes transmitting first information to the second BS when an identifier of a present cell is other than the first and second identifiers, and transmitting second information to the second BS when the identifier of the present cell is the first or second identifier, and controlling an operation of the second BS based on the received first or second information.

7 Claims, 15 Drawing Sheets

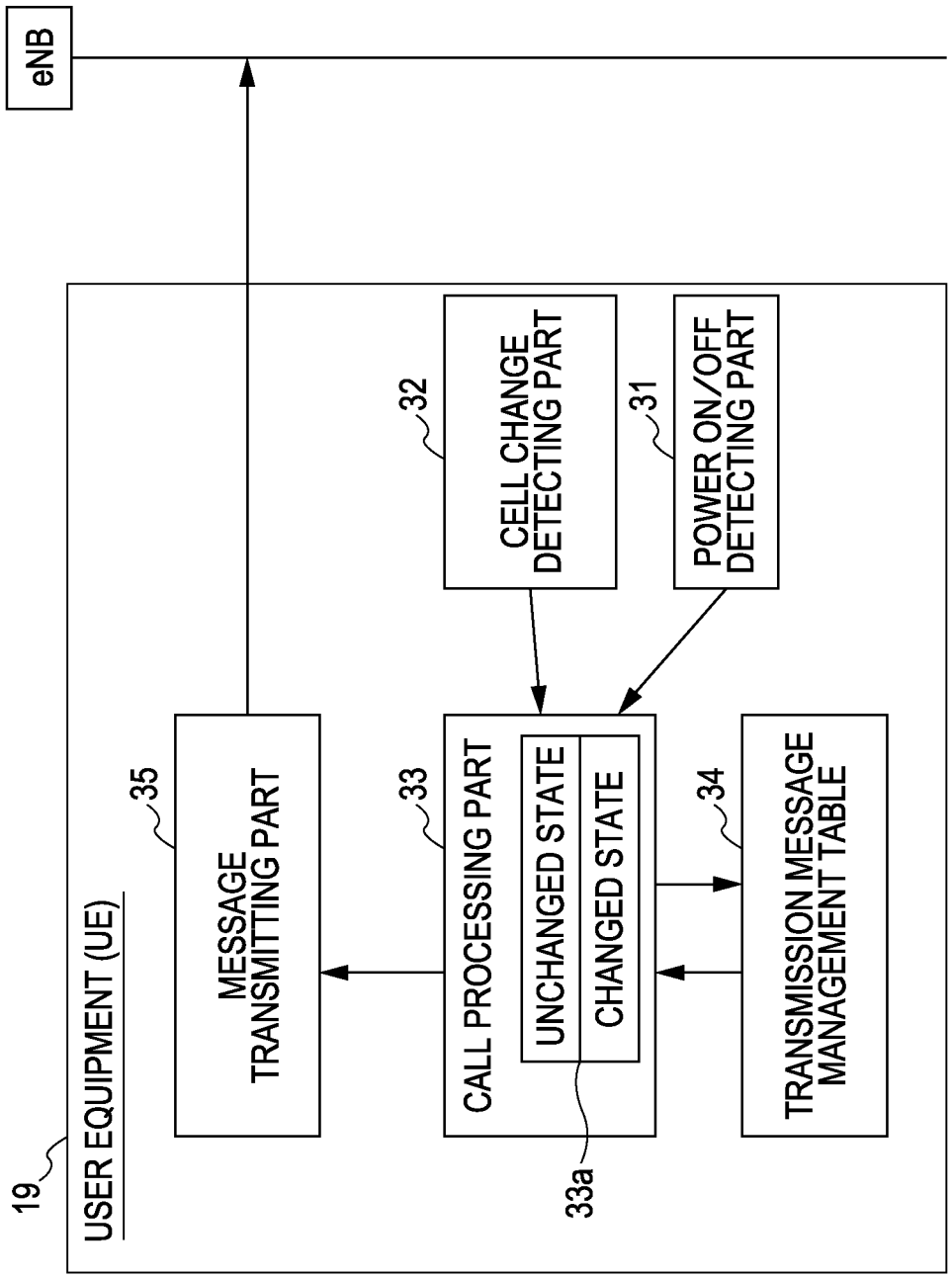

FIG. 7

| POWER SOURCE/CELL STATE BEFORE CHANGE | POWER SOURCE/CELL STATE AFTER CHANGE | | | | |
|---|---|---|---|---|---|
| | POWER ON | | | | POWER OFF |
| | AREA UNDER Home eNB | VICINITY PREDETERMINED AREA | AREA OTHER THAN THE LEFT ONES | POWER OFF | |
| POWER ON — AREA UNDER Home eNB | NONE | NONE | NONE | POWER OFF | |
| POWER ON — VICINITY PREDETERMINED AREA | NONE | NONE | NONE | "OUTING" | |
| POWER ON — AREA OTHER THAN THE ABOVE ONES | NONE | "RETURN HOME" | NONE | "OUTING" | |
| POWER OFF | "RETURN HOME" | "RETURN HOME" | NONE | NONE | |

FIG. 8

| RRC HEADER | MESSAGE TYPE | SIGNAL TYPE | USER EQUIPMENT IDENTIFIER | MME IDENTIFIER | Home eNB (CELL) IDENTIFIER |

FIG. 11

| S1-AP HEADER | MESSAGE TYPE | SIGNAL TYPE | USER EQUIPMENT IDENTIFIER |

FIG. 12

| S1-AP HEADER | MESSAGE TYPE | SIGNAL TYPE | USER EQUIPMENT IDENTIFIER | MME IDENTIFIER | Home eNB (CELL) IDENTIFIER |

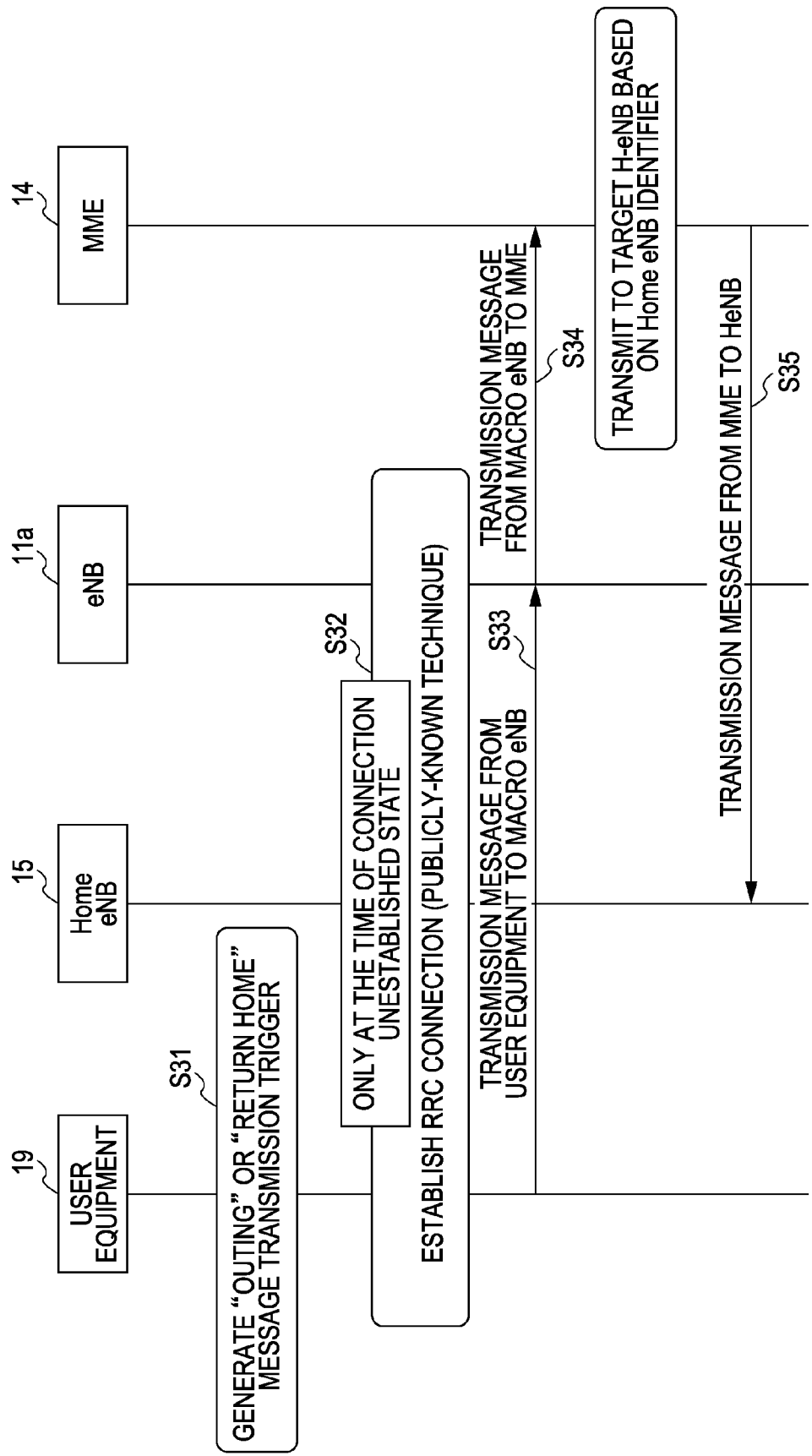

WIRELESS COMMUNICATION SYSTEM, MOBILE STATION, WIRELESS BASE STATION AND COMMUNICATION METHOD

CROSS-REFERENCE TO RELATED APPLICATIONS

This application is based upon and claims the benefit of priority of the prior Japanese Patent Application No. 2008-238894, filed on Sep. 18, 2008, the entire contents of which are incorporated herein by reference.

FIELD

The present invention relates to a wireless communication system which wirelessly connects a mobile station and a wireless base station, a mobile station, a wireless base station, and a communication method.

BACKGROUND

As next-generation mobile communication systems emerge, small wireless base stations (hereinafter, "Home eNB") which are installed in homes and offices and are used by specified subscribers are examined as a part of specifications of LTE (Long Term Evolution), which is discussed in 3GPP (3rd Generation Partnership Project).

Conventional wireless base stations are installed in roofs of buildings to which mobile communication providers subscribe, and the mobile communication providers prepare power sources for the wireless base stations, and connect lines from the wireless base stations to the mobile communication providers' networks. Cells which are provided by the wireless base stations can be generally used by all subscribers who subscribe to the mobile communication providers.

Subscribers of the mobile communication providers may install Home eNB in homes and further prepare power sources and networks. Contrary to the cells from the conventional wireless base stations, the cells provided by the Home eNB can only be used by the subscribers and others who are allowed by the subscribers, such as family members.

The mobile communication providers can more easily expand coverage of mobile communication services by using the Home eNB in comparison to the conventional wireless base stations. Furthermore, communications via the Home eNB allows the mobile communication providers to reduce the costs of the communication charged to the subscribers to a price point that is roughly equivalent to the costs of communication via general fixed networks, thereby encouraging the substitution of fixed networks with mobile telephones networks. As a result, the mobile communication providers can provide new services such as the seamless provisioning of communication services with one home mobile station, in addition to the mobile station outside the home.

FIG. 1 illustrates one example of a cell configuration using the Home eNB. In the drawing, a wireless base station (hereinafter referred to as an "evolved Node B" or an "eNB") 1 is connected to a mobile communication provider network (mobile communication network) 2, and the wireless base station 1 forms macrocells 3 and 4 at its subordinate positions.

A Home eNB 5 is a compact wireless base station which is provided into the macrocell 4. The Home eNB 5 is connected to the mobile communication network 2 via a public IP (Internet Protocol) network 7, for example, and forms a home eNB cell 8 at its subordinate position.

The Home eNB 5 is connected to the public IP network 7 by a broadband line such as an optical cable or ADSL.

A technique which enables only a mobile station which is allowed to use a base station for communications is known. A technique which performs posting/setting from an ultra-compact base station to a portable network and uses a spread code/identification code which is different from codes of neighborhood base stations in order to avoid interference, and a technique which recognizes intrusion/pulling-out of an in-plant network by positional registration of a mobile station and starts/ends the service are known (for example, see Japanese Laid-Open Patent Publication Nos. 2005-109570 and 2006-261722, 2004-274767).

Various operational forms of the Home eNB are present, one of them being a form of use in which, when the Home eNB is installed in a residential home, only family mobile stations are permitted to access the Home eNB. In such a Home eNB, where subscribers who can use it are limited, there may be cases where no subscriber is present in this coverage area for a long time.

In general, a wireless base station continuously transmits broadcast information even when a subscriber is not present in a coverage area of the base station. When a subscriber moves into the coverage area, the wireless base station instantly accepts a new call request or handover request and continues to provide a smooth and seamless connection to a mobile network.

A similar mechanism is applied to the Home eNB, but because no subscriber may be present in the Home eNB coverage area for a long time, the Home eNB may continue to transmit useless information for a time period in which no subscribers are in the coverage area. This is not efficient because electric power is needlessly consumed and peripheral cells may be unnecessarily interfered with.

Once the Home eNB stops transmitting broadcast information, the Home eNB may not detect the approach of a subscriber who can otherwise use the Home eNB. In this scenario, the Home eNB may not detect the approach of the subscriber and may not restart the transmission of the broadcast information to provide the subscriber with a smooth and seamless connection to the mobile network. Therefore, in the conventional setting, broadcast information is continuously transmitted otherwise the provision of a smooth and seamless connection environment is given up. If the broadcast information is not continuously transmitted, subscribers of the Home eNB or a family member of the subscriber must manually cut the connection before leaving the coverage area and must manually reconnect the Home eNB to the mobile network after returning home.

Further, when a Home eNB is installed in a school or a in a corporate setting, it is difficult to know when the last subscriber who has access to the Home eNB leaves the coverage area. For this reason, it is difficult for the subscriber to decide when to manually turn off the power.

SUMMARY

According to an aspect of the invention, a wireless communication system having a plurality of wireless base stations, and a second wireless base station included under at least one of a first wireless base station among the plurality of wireless base stations and usable by a specified mobile station, the wireless communication system includes registering first identifiers as identifiers of the first wireless base station and a second identifier as an identifier of the second wireless base station in the specified mobile station in advance. The wireless communication system includes transmitting first information to the second wireless base station when an identifier of a present cell is other than the first and second identifiers, and transmitting second information to the second wireless base station when the identifier of the present cell is the first or second identifier, and controlling an operation of the second wireless base station based on the received first or second information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram of a configuration illustrating the mobile station according to one embodiment;

FIG. 7 is a diagram illustrating a transmission message management table;

FIG. 8 illustrates a format of a RRC message according to one embodiment;

FIG. 11 illustrates a format of a message transmitted from the MME to the Home eNB according to one embodiment;

FIG. 12 illustrates a format of a message transmitted from the eNB or the Home eNB to the MME according to one embodiment;

FIG. 16 illustrates a sequence of message transmission/reception according to one embodiment.

DESCRIPTION OF PREFERRED EMBODIMENTS

An embodiment will be described below with reference to the drawings.

<System Configuration>

Figure 1:
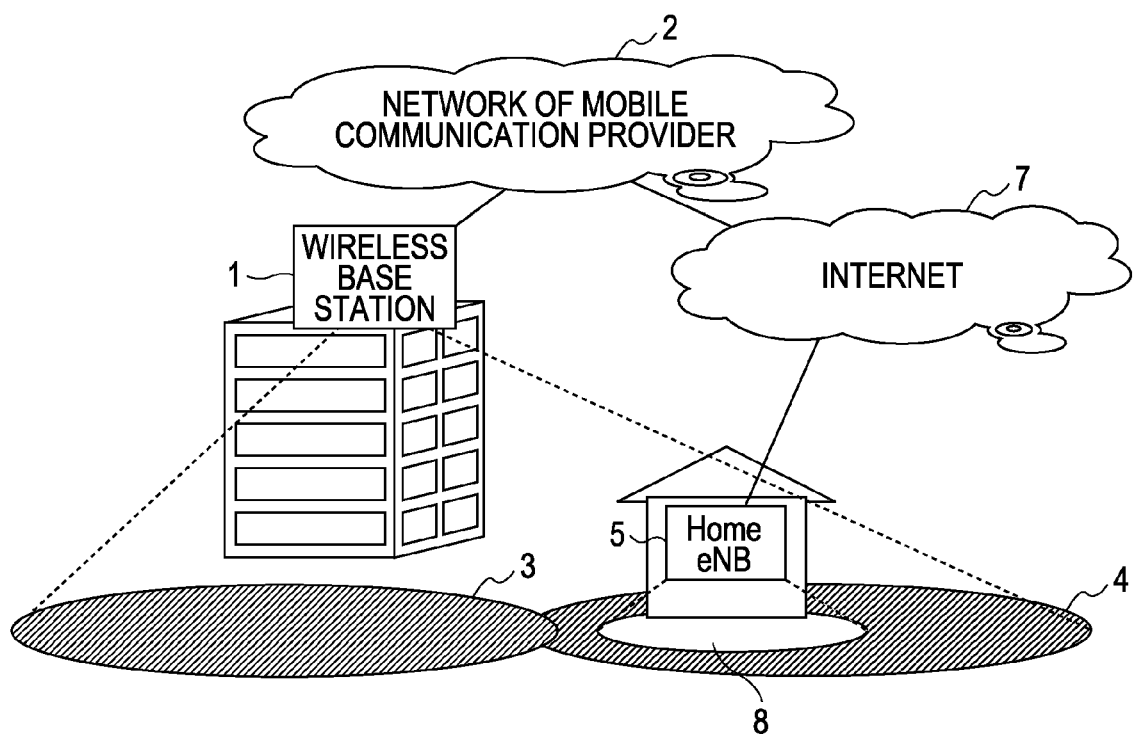
FIG. 1 is a diagram illustrating one example of a cell configuration using a Home eNB.
Figure 2:
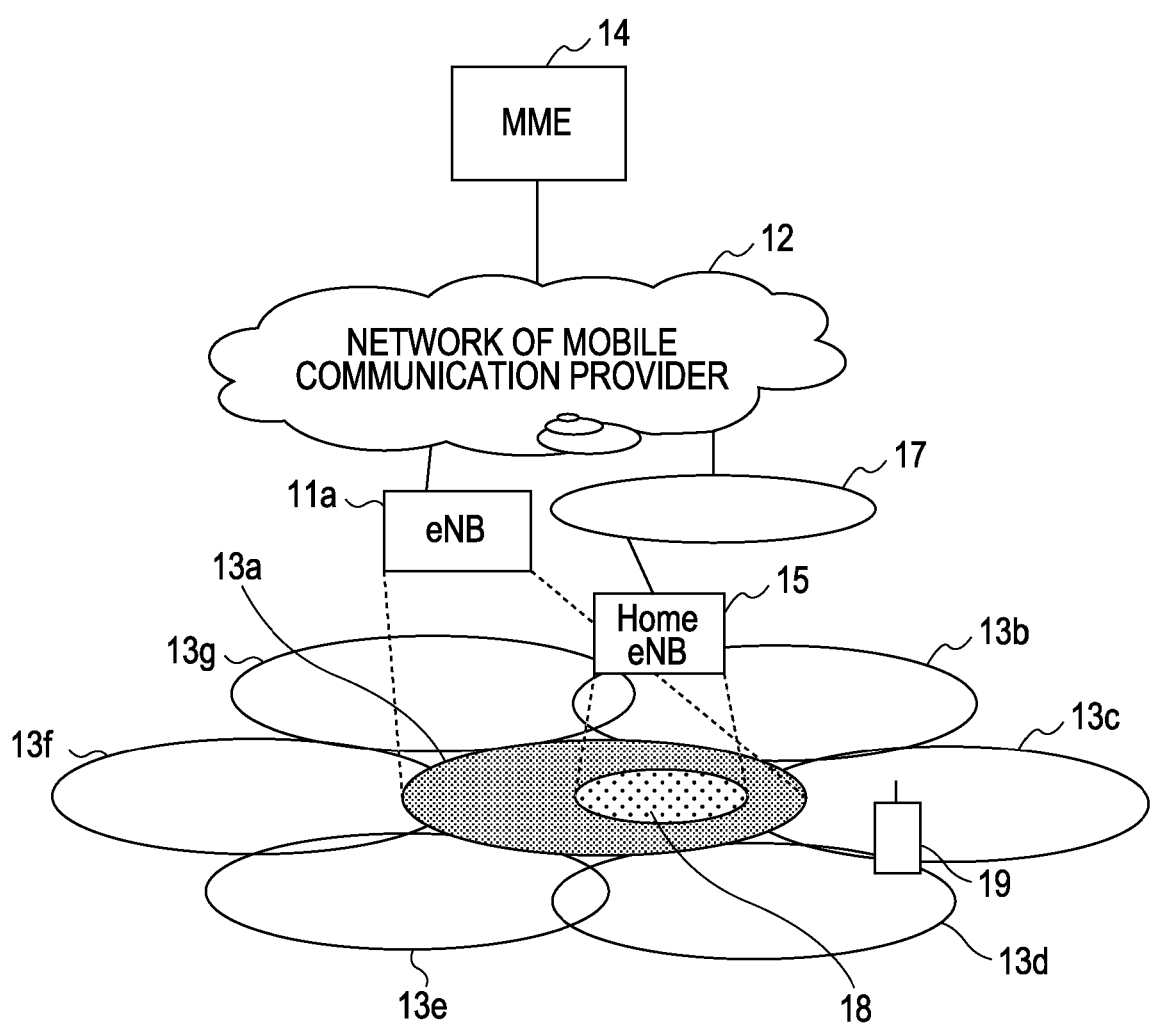
FIG. 2 is a diagram illustrating a cell configuration of a wireless communication system according to one embodiment.

FIG. 2 illustrates a cell configuration of a wireless communication system according to one embodiment. In FIG. 2, a plurality of wireless base stations (eNB) 11a to 11g (only 11a is illustrated) are connected to a network of a mobile communication provider (mobile communication network) 12, and the wireless base stations 11a to 11b form macrocells 13a to 13g at its subordinate position. That is, the wireless base station 11a forms the macrocell 13a, the wireless base station 11b forms the macrocell 13b, and similarly the wireless base station 11g forms the macrocell 13g at its subordinate position.

The mobile communication network 12 is provided with MME (Mobility Management Entity) 14 as a control apparatus which entirely controls the wireless communication system.

A Home eNB 15 is provided into the macrocell 13a at its subordinate position. The Home eNB 15 is connected to the mobile communication network 12 of the mobile communication provider via a public IP network 17, for example, and the Home eNB 15 forms a Home eNB cell 18 at its subordinate position. The Home eNB 15 is connected to the public IP network 17 via a broadband line such as an optical cable or ADSL. A mobile station (hereinafter sometimes referred to as a "user equipment" or a "UE") 19 can use the Home eNB 15.

In this case, the Home eNB cell 18 is called a Home eNB area, the macrocell 13a which surrounds the Home eNB cell 18 as well as an overlapped part of the Home eNB cell 18 is called a vicinity specified area, and the macrocells 13b to 13g other than the macrocell 13a are called peripheral areas. Further, since the wireless base stations 11a to 11g form the macrocells, they are also called macro eNB.

A cell identifier of the Home eNB 15 and (one or a plurality of) cell identifier of macrocells which compose the vicinity specified area 13a of the home eNB 15, in one embodiment, are registered in the user equipment 19 in advance of transmitting or receiving wireless communications. User equipment 19 can use the Home eNB 15.

<Operation of the Mobile Station at the Time of Establishing a Connection Between the Mobile Station and the Mobile Communication Network>

The user equipment 19, which can use the Home eNB 15, performs the following operation to establish a connection to the mobile communication network 12. Once a connection has been established, the user equipment 19 is considered to be in a connected state.

Each time a connection cell is changed, the user equipment 19 compares a cell identifier of a cell in which it is presently in a connected state and a cell identifier of a cell in which the user equipment 19 will be newly connected to with the cell identifier of the Home eNB 15 and the cell identifier of a macrocell in the vicinity of specified area 13a.

Figure 3:
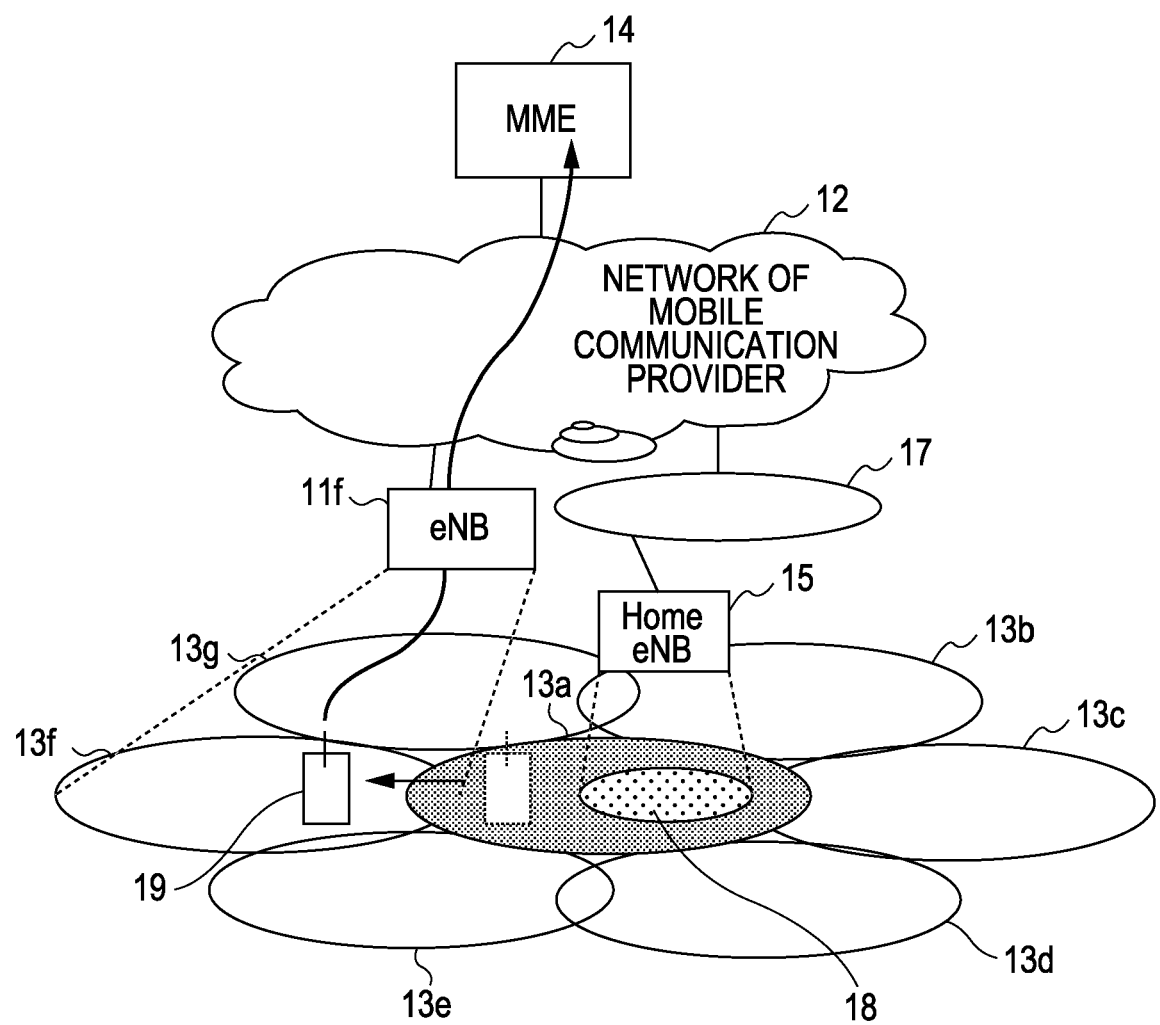
FIG. 3 depicts an operation of a mobile station.

As illustrated in FIG. 3, when the cell identifier of the cell in which the user equipment 19 is presently in a connected state matches the cell identifier of the macrocell in the vicinity specified area 13a, and the cell identifier of the cell in which the user equipment 19 will be newly connected to does not match the cell identifier of the Home eNB 15 and the cell identifier of the macrocell in the vicinity specified area 13a, namely, the user equipment 19 moves from the vicinity specified area 13a to a peripheral area 13f, an "outing" message is transmitted to the MME 14 of the mobile communication network 12 by using the connection established via the macrocell of the peripheral area 13f. The "outing" message corresponds to first information.

Figure 4:
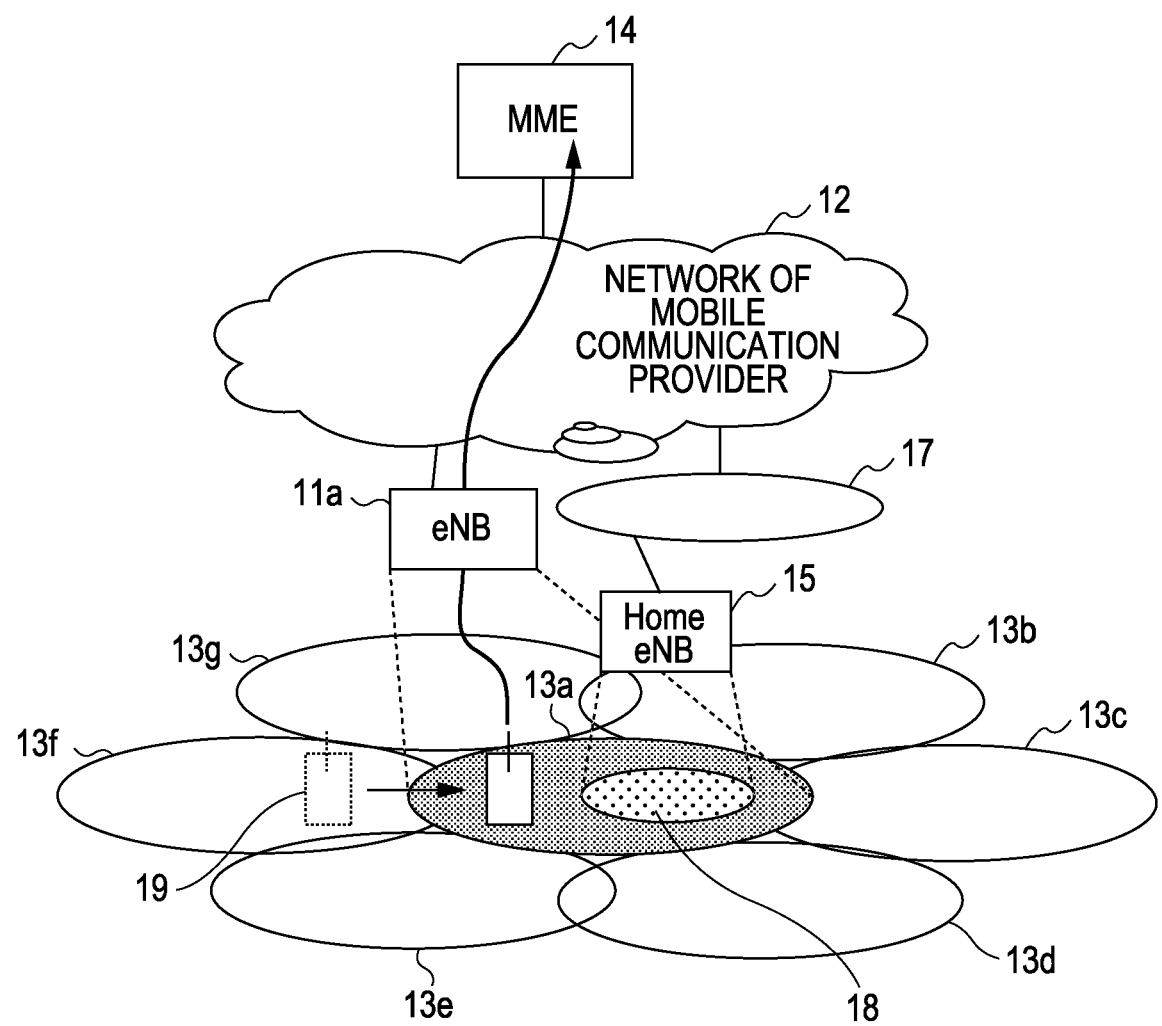
FIG. 4 depicts an operation of the mobile station.

As illustrated in FIG. 4, when the cell identifier of the cell in which the user equipment 19 is presently in a connected state does not match the cell identifier of the Home eNB 15 and the cell identifier of the macrocell in the vicinity of specified area 13a, and the cell identifier of the cell in which the user equipment 19 will be newly connected to matches the cell identifier of the macrocell in the vicinity specified area 13a, namely, the user equipment 19 moves from the peripheral area 13f to the vicinity of specified area 13a, a "return home" message is transmitted to the MME 14 by using the connection established via the macrocell in the vicinity specified area 13a. The "return home" message corresponds to second information in a particular embodiment.

When the user equipment 19 in a power ON state is changed into a power OFF state, the user equipment 19 compares the cell identifier of the cell connected at the time of the power ON state with the cell identifier of the Home eNB 15 and the cell identifier of the macrocell in the vicinity of specified area 13*a*.

When the cell identifier of the connected cell matches with the cell identifier of the Home eNB 15 or the cell identifier of the macrocell in the vicinity of specified area 13*a*, the "outing" message is transmitted to the MME 14 by using the established connection before the user equipment 19 is turned off.

<Operation of the Mobile Station at the Time When the Connection Between the Mobile Station and the Mobile Communication Network has not been Established>

The user equipment 19, which can use the Home eNB 15, performs the following operation when the connection to the mobile communication network 12 has not been established. In this circumstance, the user equipment 19 is considered to be in the idle state.

The user equipment 19, in the idle state, compares a cell identifier of a cell monitored and a cell identifier of a cell to be newly monitored, with the cell identifier of the Home eNB 15 and the cell identifier of the macrocell in the vicinity of specified area 13*a* each time a monitor cell is changed.

When the cell identifier of the cell monitored matches the cell identifier of the macrocell in the vicinity of specified area 13*a* and the cell identifier of the cell to be newly monitored does not match the cell identifier of the Home eNB 15 and the cell identifier of the macrocell in the vicinity of specified area 13*a*, namely, the user equipment 19 moves from the vicinity of specified area 13*a* to the peripheral area 13*f*, the connection is established via the cell in the peripheral area 13*f*, and the "outing" message is transmitted to the MME 14 by using this connection.

When the cell identifier of the cell monitored does not match the cell identifier of the Home eNB 15 and the cell identifier of the macrocell in the vicinity of specified area 13*a*, and the cell identifier of the cell to be newly monitored matches the cell identifier of the macrocell in the vicinity of specified area 13*a*, namely, the user equipment moves from the peripheral area 13*f* to the vicinity of specified area 13*a*, the connection is established via the cell in the vicinity of specified area 13*a*, and the "return home" message is transmitted to the MME 14 by using the connection.

When the user equipment 19 is changed from the power OFF state into the power ON state, the user equipment 19 compares a cell identifier of a cell in which the position is registered with the cell identifier of the Home eNB 15 and the cell identifier of the macrocell in the vicinity of specified area 13*a*.

When the cell identifier of the cell whose position is registered matches the cell identifier of the Home eNB 15 or the cell identifier of the macrocell in the vicinity of specified area 13*a*, the "return home" message is transmitted to the MME 14 by using the connection established for the position registration.

When the user equipment 19 is changed from the power ON state into the power OFF state, the user equipment 19 compares the cell identifier of the cell monitored at the time of power ON with the cell identifier of the Home eNB 15 and the cell identifier of the macrocell in the vicinity of specified area 13*a*.

When the cell identifier of the monitored cell matches the cell identifier of the Home eNB 15 or the cell identifier of the macrocell in the vicinity of specified area 13*a*, the connection is established via the cell and the "outing" message is transmitted to the MME 14 by using the connection before the user equipment 19 is turned OFF.

<Operations of the MME and the Home eNB>

Figure 5:
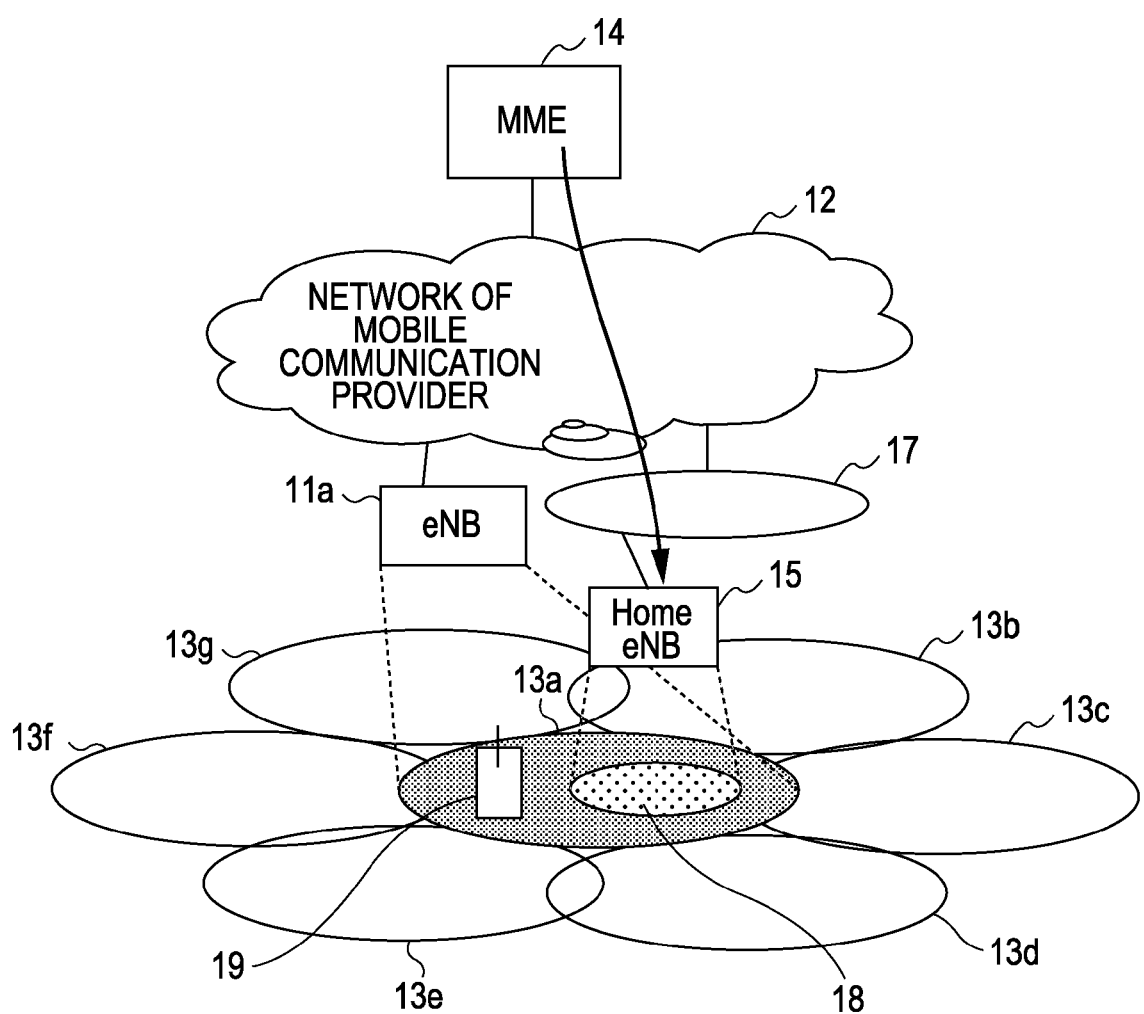
FIG. 5 depicts an operation of MME.

As illustrated in FIG. 5, the MME 14, which receives the "return home" message or the "outing" message, transmits the received message to the corresponding Home eNB 15.

The Home eNB 15 manages the states of all user equipment which can use the Home eNB 15. That is, for the case where the last message received is the "outing" message, the Home eNB 15 considers the user equipment 19 to be in an "outing" state. Similarly, for the case where the last message received is the "return home" message, the user equipment 19 is considered to be in a "return home" state.

When all the user equipment which can use the Home eNB 15 are in the "outing" state, the Home eNB 15 reduces or turns off the output power so as to stop the transmission of related broadcast information.

When at least one of the user equipment which can use the Home eNB 15 is in the "return home" state with the transmission of the broadcast information being stopped, the Home eNB 15 restarts the transmission of the related broadcast information with the output power being ON or rated output.

<Configuration of the Mobile Station>

FIG. 6 is a diagram of a configuration illustrating the mobile station which can use the Home eNB according to one embodiment. In FIG. 6, the user equipment 19 has a power ON/OFF detecting part 31, a cell change detecting part 32, a call processing part 33, a transmission message management table 34 and a message transmitting part 35.

When the power ON/OFF detecting part 31 detects power ON and OFF of the user equipment, it posts a detected result to the call processing part 33.

When the cell change detecting part 32 detects that the cell where the self user equipment 19 is presently in a connected state is changed, it posts the cell where the self user equipment 19 is present as a detected result to the call processing part 33.

The call processing part 33 stores an unchanged state and a changed state in a built-in storage part 33*a*. When the call processing part 33 receives the posting of the detected result from the power ON/OFF detecting part 31 or the cell change detecting part 32, it transfers the changed state of the storage part 33*a* to the unchanged state and stores the posted detection state in the changed state of the storage part 33*a*. The call processing part 33 searches the transmission message management table 34 using the unchanged state and the changed state of the storage part 33*a*.

The cell identifier of the Home eNB which is usable by the self user equipment and (one or a plurality of) the cell identifier of the macrocell in the vicinity specified area are registered in the transmission message management table 34 in advance of transmitting or receiving wireless communications. In the case of a plurality of Home eNBs which are usable by the self user equipment, a plurality of transmission message management tables are provided.

As illustrated in FIG. 7, transmission messages are registered in the transmission message management table 34 in advance of transmitting or receiving wireless communications, according to the unchanged state and the changed state. That is, when the user equipment 19 is powered ON in an unchanged state and in an area under the Home eNB, and the changed state is powered OFF, the "outing" message is set. When the user equipment 19 is powered ON in an unchanged state and in the vicinity of specified an area and the changed state is powered ON and the user equipment 19 is relocated to a peripheral area or powered OFF, the "outing" message is set.

When the user equipment 19 is powered ON and in the unchanged state and in the peripheral area, and the changed state is in the vicinity specified area, the "return home" message is set. When the user equipment 19 is powered OFF and in the unchanged state, and the changed state is powered ON and in the area under the Home ENB or in the vicinity of specified an area, the "return home" message is set. No message is set when the search of the transmission message management table results in a "None".

When the call processing part 33 acquires the "outing" message or the "return home" message by searching the transmission message management table 34, it supplies the acquired "outing" message or "return home" message to the message transmitting part 35.

The message transmitting part 35 transmits the supplied "outing" message or "return home" message as an RRC (Radio Resource Control) message to the MME 14 via the eNB or the Home eNB.

FIG. 8 illustrates a format of the RRC message according to one embodiment. In FIG. 8, an RRC header is provided within the head of the message, and a "Home eNB" posting message (up link) is set within the subsequent message type field. The "return home" message or the "outing" messaging is set within the signal type field, and the identifier of the user equipment 19 of a transmission source is set within the user equipment identifier field. The identifier of the MME 14 is set within the MME identifier field, and the identifier of the Home eNB 15 to which the message is transmitted by the MME 14 is set within the Home eNB identifier field.

The RRC message is converted into a message of S1-AP protocol in FIG. 12 and described later by the eNB or the Home eNB so as to be transmitted to the MME 14. FIG. 12 illustrates a format of the message to be transmitted from the eNB or the Home NB to the MME according to one embodiment.

Figure 9:
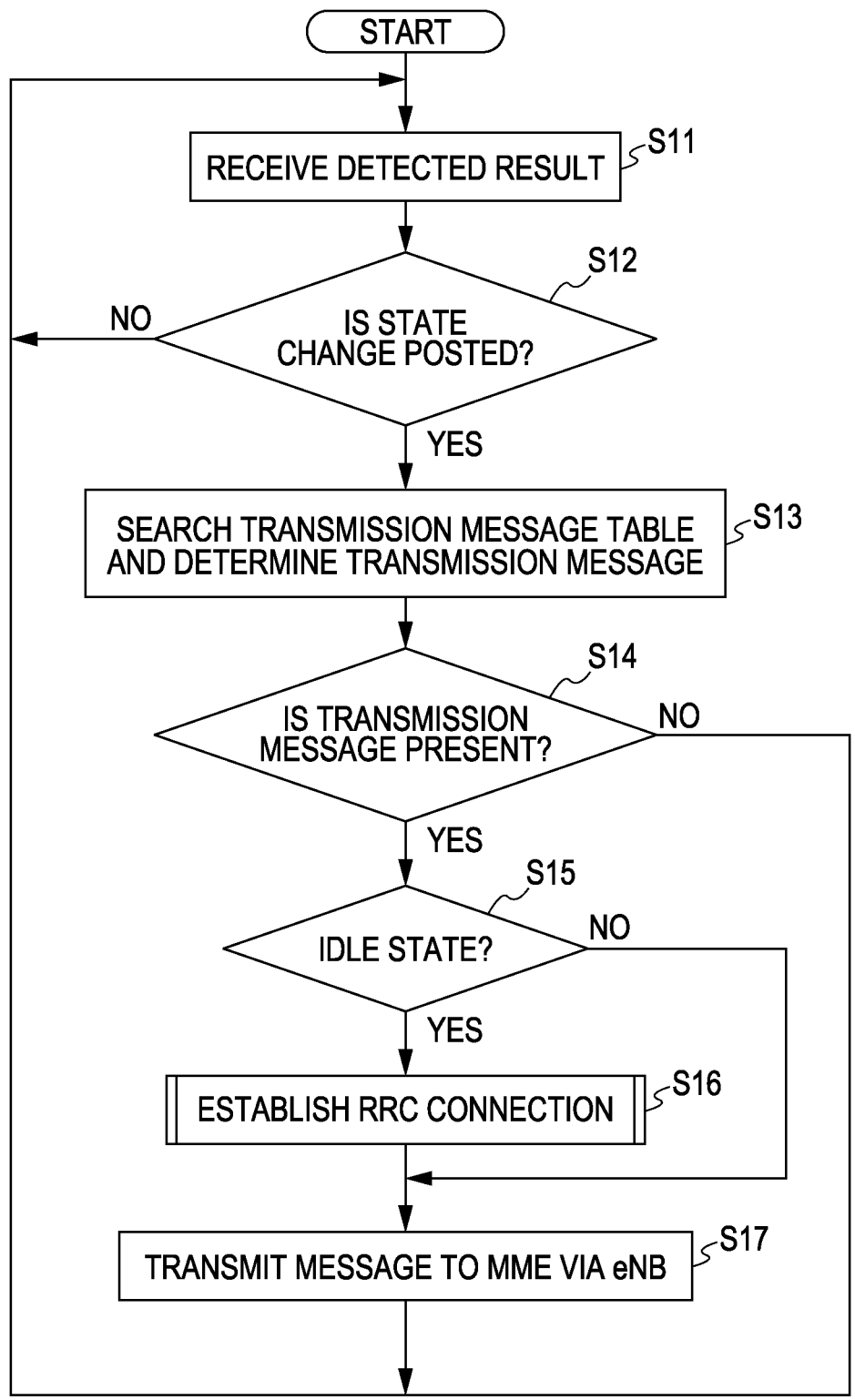
FIG. 9 is a flowchart illustrating a process executed by the mobile station according to one embodiment.

The flowchart of FIG. 9 illustrates a process to be executed by the call processing part of the user equipment according to one embodiment. In FIG. 9 at step S11, the call processing part 33 receives a detected result from the power ON/OFF detecting part 31 or the cell change detecting part 32.

The call processing part 33 determines whether the state is changed at step S12, and when the state is not changed, the process proceeds to step S11, and when the state is changed, the process proceeds to step S13. The call processing part 33 searches the transmission message management table 34 using the unchanged state and the changed state so as to determine a transmission message at step S13.

The call processing part 33 determines whether the transmission message is acquired at step S14. When the transmission message is not acquired, the process proceeds to step S11. When the transmission message is acquired, the call processing part 33 determines whether the self user equipment is in an idle state at step S15. When the self user equipment is in the idle state, the call processing part 33 establishes an RRC connection to the MME 14 in step S16, and the process proceeds to step S17.

When the self user equipment is not in the idle state but establishes a connection to the mobile communication network 12, the process proceeds to step S17. The call processing part 33 transmits the "outing" message or the "return home" message acquired from the transmission message management table 34 at step S17 to the MME 14 via the eNB or the Home eNB so that the process proceeds to step S11.

<Configuration of the Home eNB>

Figure 10:
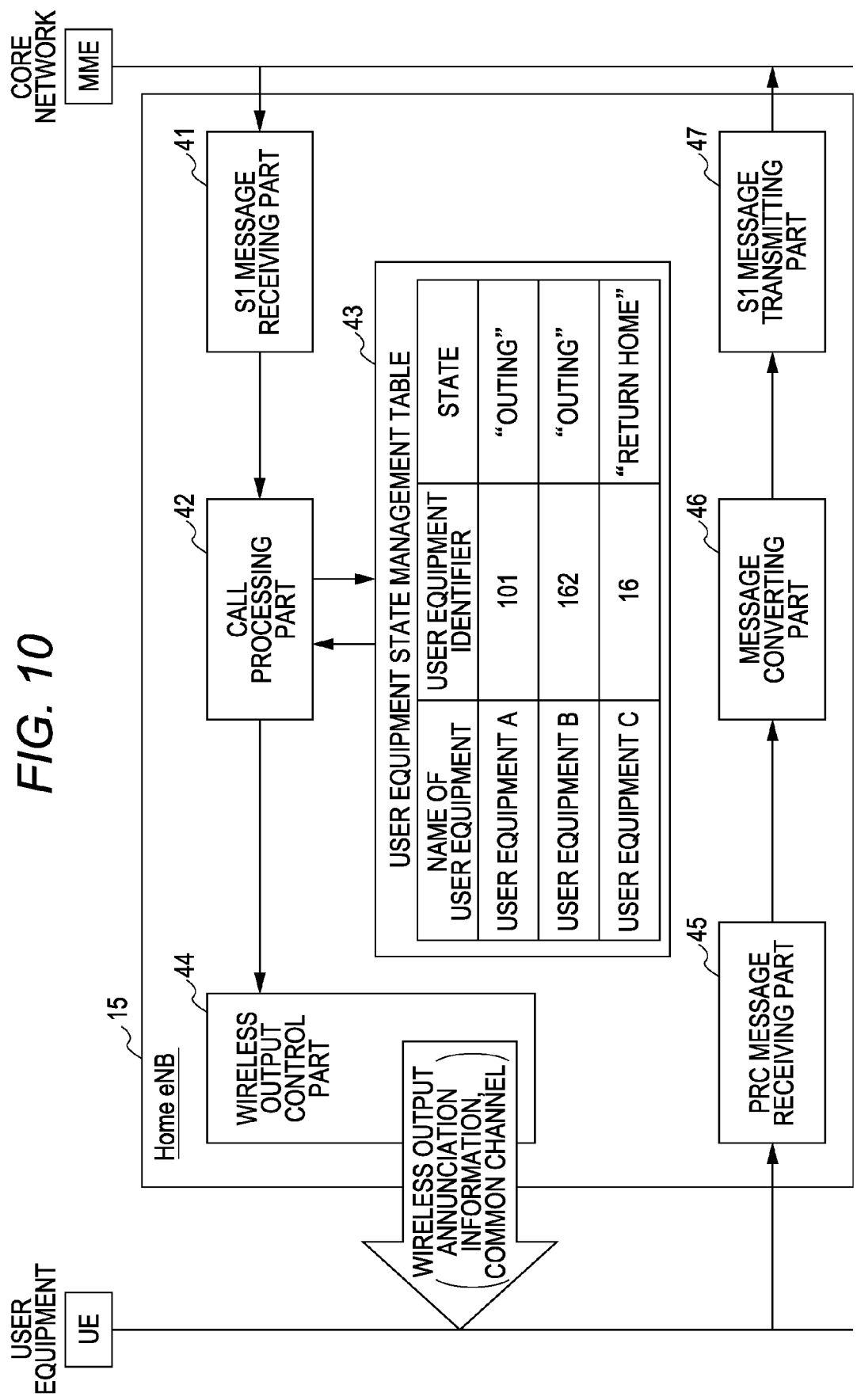
FIG. 10 is a diagram of a configuration illustrating the Home eNB according to one embodiment.

FIG. 10 is a diagram of a configuration illustrating the Home eNB according to one embodiment. In FIG. 10, the Home eNB 15 has an S1 message receiving part 41, a call processing part 42, a user equipment state management table 43, a wireless output control part 44, an RRC message receiving part 45, a message converting part 46 and an S1 message transmitting part 47.

The S1 message receiving part 41 receives a message of S1-AP protocol transmitted from the MME 14 via the mobile communication network 12 and the IP network 17 so as to supply it to the call processing part 42. For example, S1 is the name of interface between the MME 14 and the eNB in LTE, and S1-AP is control signal protocol on the S1 interface.

FIG. 11 illustrates a format of the message to be transmitted from the MME to the Home eNB according to one embodiment. In FIG. 11, an S1-AP header is provided within the head field, and "down link" (transmission from the MME 14 to the Home eNB) is set within the subsequent message type field. The "Return home" or "outing" is set within the signal type field, and an identifier of a mobile station as transmitting destination is set within the mobile station identifier field.

When the message is supplied to the call processing part 42 from the S1 message receiving part 41, the call processing part 42 refers to the user equipment state management table 43 using the user equipment identifier of the message, and updates the state of the user equipment 19 in the user equipment state management table 43, based on "return home" or "outing" in the signal type of the message.

The names of all the user equipment which can connect to the Home eNB 15, and user equipment identifiers and states (for example, "return home" or "outing") are registered in the user equipment state management table 43.

The call processing part 42 controls the wireless output from the wireless output control part 44, according to whether the states of all of the user equipment 19 registered in the user equipment state management table 43 are "outing".

When the states of all of the user equipment 19 registered in the user equipment state management table 43 are "outing," the wireless output control part 44 sets the wireless output to OFF (or reduces it), and when the states of all the user equipments 19 are not "outing," the wireless output control part 44 sets the wireless output to ON (or rated output).

The RRC message receiving part 45 receives the RRC message transmitted from the user equipment 19 and supplies it to the message converting part 46. The message converting part 46 converts the RRC message into a message of S1-AP protocol, and transmits it to the MME 14 from the S1 message transmitting part 47 via the IP network 17 and the mobile communication network 12.

FIG. 12 illustrates a format of the message to be transmitted from the eNB or Home eNB to the MME according to one embodiment. In FIG. 12, an S1-AP header is provided within the head field, and "up link" (transmission from the Home eNB to the MME 14) is set within the subsequent message type field. The "Return home" or "outing" is set within the signal type field, and the identifier of the user equipment 19 as transmitting destination is set within the user equipment identifier field. The identifier of the MME 14 as transmitting destination is set within the MME identifier field, and the identifier of the Home eNB 15 as destination to which the MME 14 transmits the message is set within the Home eNB identifier field.

Figure 13:
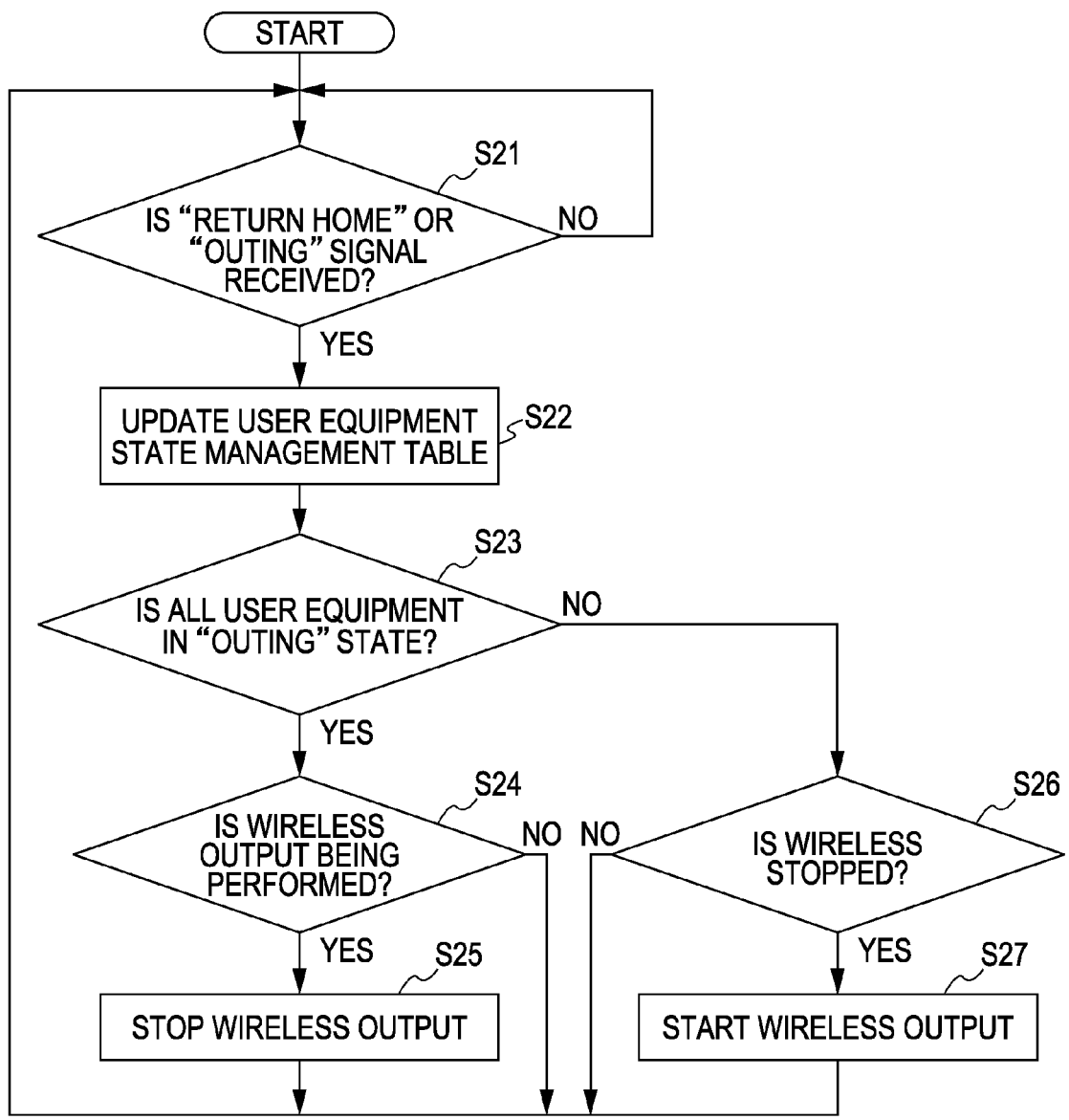
FIG. 13 is a flowchart illustrating a process executed by the Home eNB according to one embodiment.

FIG. 13 is a flowchart illustrating a process to be executed by the call processing part 42 of the Home eNB according to one embodiment. In FIG. 13, the call processing part 42 receives a message transmitted to the Home eNB at step S21.

The call processing part 42 refers to the user equipment state management table 43 using the user equipment identifier of a received message, and updates the state of the user equipment in the user equipment state management table 43 based on "return home" or "outing" on the signal type of the message at step S22. Thereafter, the call processing part 42 determines at step S23 whether the states of all the user equipment registered in the user equipment state management table 43 are of the "outing" state.

When all the user equipment are in the "outing" state, the process proceeds to step S24, and when the wireless output control part 44 is performing wireless output, the wireless output control part 44 is turned off (or reduces output) at step S25, and the process proceeds to step S21.

When all the user equipment are not in the "outing" state, the process proceeds to step S26, and when the wireless output control part 44 is stopping wireless output, the wireless output control part 44 is turned on (or rated output) at step S27, and the process proceeds to step S21.

<Registered Information about Mobile Station>

Figure 14:
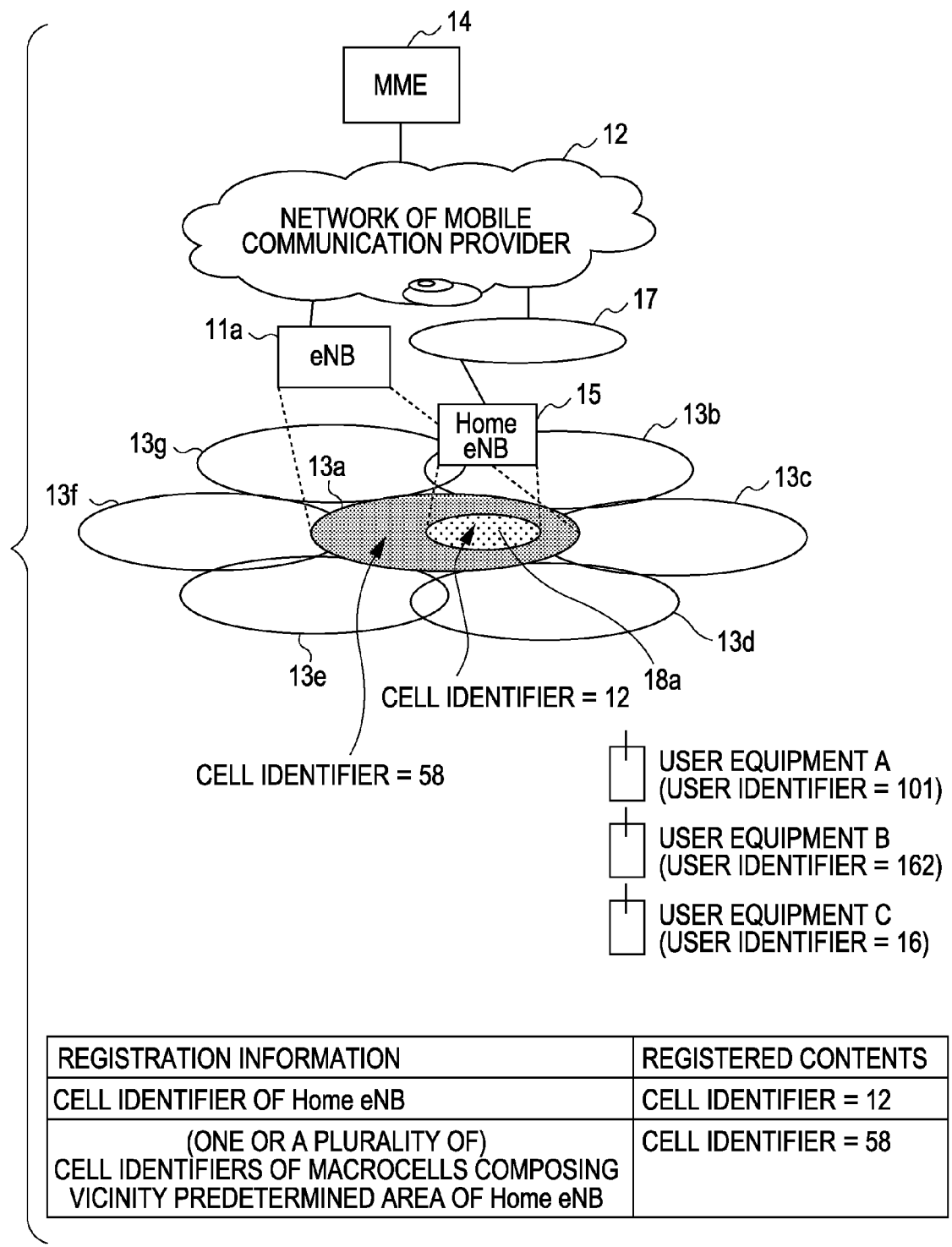
FIG. 14 depicts a case where one vicinity specified area is present.

As illustrated in FIG. 14, one macrocell 13a which surrounds a Home eNB cell 18a as well as an overlapped portion of the Home eNB cell 18a is a vicinity specified area. In the following description, a cell identifier of the Home eNB cell 18a is 12, a cell identifier of the macrocell 13a as the vicinity specified area is 58, and only a user equipment A (identifier=101), a user equipment B (identifier=162) and a user equipment C (identifier=16) can use the Home eNB cell 18.

In this case, the cell identifier 12 of the Home eNB cell 18a is usable by the self user equipment and the cell identifier 58 of the macrocell in the vicinity specified area are registered in the user equipments A, B and C, in one embodiment, in advance of transmitting or receiving wireless communications.

Figure 15:
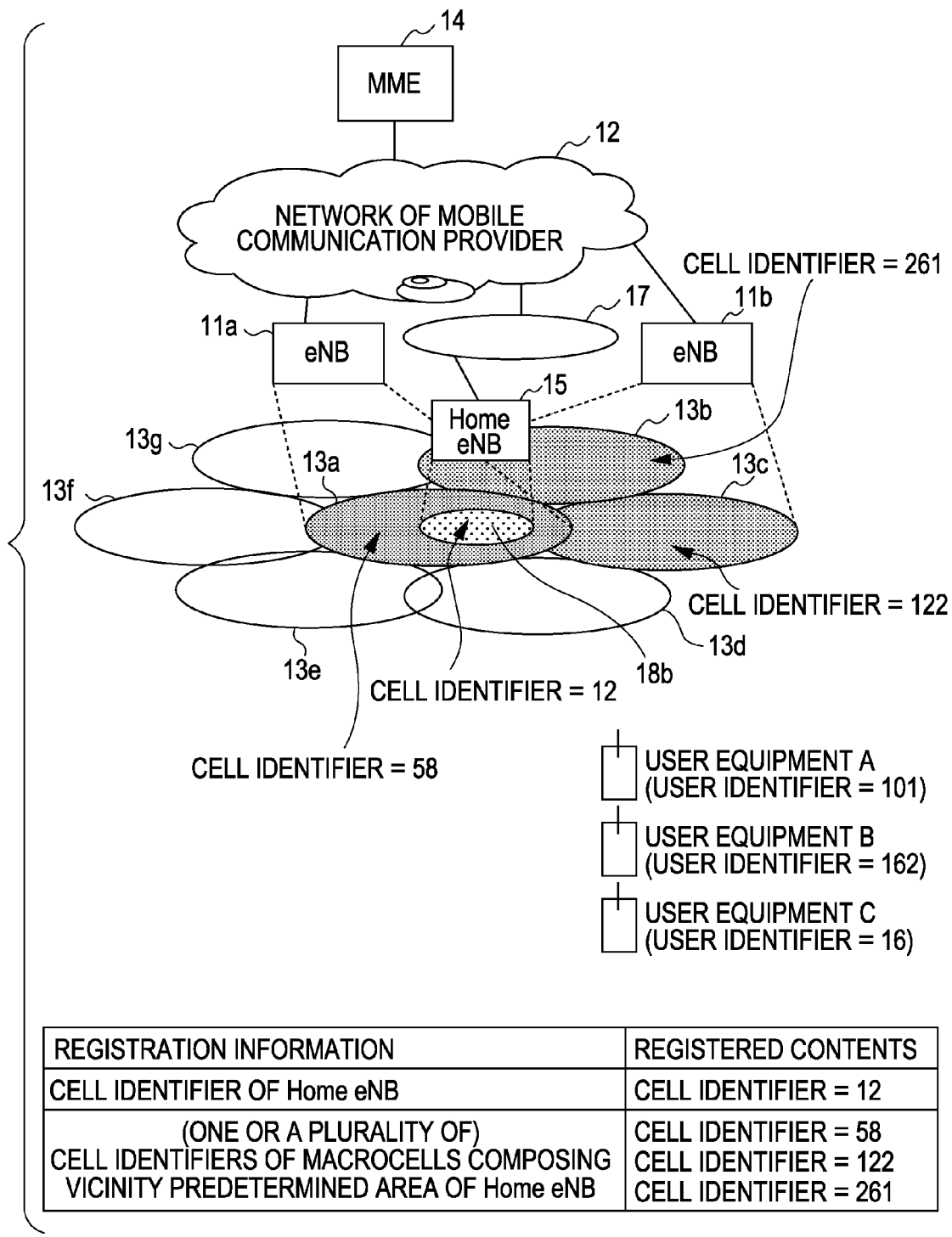
FIG. 15 depicts a case where a plurality of vicinity specified areas are present.

As illustrated in FIG. 15, three macrocells 13a, 13b and 13c which surround a Home eNB cell 18b so as to overlap with or be adjacent to the Home eNB cell 18b are vicinity specified areas. In the following description, the cell identifier of the Home eNB cell 18b is 12, the cell identifier of the macrocell 13a in the vicinity specified area is 58, a cell identifier of the macrocell 13b is 261, the cell identifier of the macrocell 13c is 122, and only the user equipment A (identifier=101), the user equipment B (identifier=162) and the user equipment C (identifier=16) can use the Home eNB cell 18b.

In this case, the cell identifier 12 of the Home eNB cell 18b is usable by the self user equipment and the cell identifiers 58, 122 and 261 of the macrocells in the vicinity specified areas are registered in the user equipments A, B and C, in one embodiment, in advance of transmitting or receiving wireless communications.

FIG. 16 illustrates a sequence of the message transmission/reception according to one embodiment. In FIG. 16, transmission trigger of the "outing" or "return home" message is generated from the user equipment 19 (S31). When the user equipment 19 is in the idle state, after the RRC connection to the MME 14 is established (S32), the user equipment 19 transmits the "outing" or "return home" message to a macro eNB 11a (S33). The macro eNB 11a transmits the "outing" or "return home" message to the MME 14 (S34).

The MME 14 transmits the received "outing" or "return home" message to the Home eNB 15 (S35). As a result, the Home eNB 15 updates the user equipment state management table 43, and controls the wireless output control part 44 if necessary.

According to the above embodiment, the Home eNB 15 can manage in/out of the user equipment 19 capable of using the Home eNB present under the Home eNB 15 or in the vicinity specified area. When the user equipment 19 is not present under the Home eNB 15 or in the vicinity specified area, the Home eNB 15 can stop transmission of broadcast information. As a result, useless interference and consumption of electric power can be prevented.

When the user equipment 19 is present in the vicinity specified area, the Home eNB 15 can transmit broadcast information. As a result, an environment can be provided in which the user equipment 19 is smoothly and seamlessly connected to the Home eNB 15.

According to the above embodiment, the smooth connecting environment can be provided, and power-saving control of wireless base stations usable by only specified mobile stations can be realized.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless communication system comprising:
a mobile station;
a first wireless base station for forming a first cell; and
a second wireless base station for forming a second cell which is included in the first cell and for being usable by the station when the mobile station is one of at least one registered mobile station;
wherein the mobile station stores, in case that the mobile station is one of at least one registered mobile station, a first identifier of the first wireless base station and a second identifier of the second wireless base station;
the mobile station transmits, in case that the mobile station is one of at least one registered mobile station, first information to the second wireless base station when a third identifier of a serving wireless base station is other than the first and second identifiers, and transmits second information to the second wireless base station when the third identifier is the first identifier or the second identifier; and
the second wireless base station reduces or stops a transmitting power of the second wireless base station, when the second wireless base station detects all of the at least one registered mobile station being out of the first cell and the second cell based on the first information or the second information.

2. The wireless communication system according to claim 1, wherein the mobile station further transmits the first information when the third identifier is the first or second identifier at the time of power OFF, and transmits the second information when the third identifier is the first identifier or the second identifier at the time of power ON.

3. The wireless communication system according to claim 1, wherein the first information or the second information is transmitted to the first wireless base station via an IP network, and the IP network is coupled to a mobile communication provider network of the first wireless base station.

4. The wireless communication system according to claim 1, wherein the second wireless base station updates a mobile station state management table which stores the state of the registered mobile station based on the first information or the second information.

5. A mobile station apparatus in a wireless communication system, the mobile station comprising:

a memory for storing, in case that the mobile station is one of at least one registered mobile station, a first identifier of the first wireless base station and a second identifier of the second wireless base station, the first wireless base station forming a first cell, and the second wireless base station forming a second cell which is included in the first cell and is usable by the mobile station when the mobile station is one of at least one registered mobile station; and a transmitter for transmitting, in case that the mobile station is one of at least one registered mobile station, first information to the second wireless base station when a third identifier of a serving wireless base station is other than the first identifier and the second identifier, and transmits second information to the second wireless base station when the third identifier is the first identifier or the second identifier;

wherein the second wireless base station reduces or stops a transmitting power of the second wireless base station, when the second wireless base station detects all of the at least one registered mobile station being out of the first cell and the second cell based on the first information or the second information.

6. A wireless base station being usable by a mobile station when the mobile station is one of at least one registered mobile station, the wireless base station comprising:

a transmitter for forming a second cell which is included in a first cell formed by another wireless base station;

a receiver for receiving first information from the mobile station when the mobile station is one of at least one registered mobile station and a third identifier of a serving wireless base station is other than a first identifier of the other wireless base station and a second identifier of the wireless base station, and for receiving second information from the mobile station when the mobile station is one of at least one registered mobile station and the third identifier is the first identifier or the second identifier; and a controller for reducing or stopping a transmitting power of the wireless base station, when the wireless base station detects all of the at least one registered mobile station being out of the first cell and the second cell based on the first information or the second information.

7. A communication method in a wireless communication system including a mobile station, a first wireless base station for forming a first cell, and a second wireless base station for forming a second cell which is included in the first cell and being usable by the mobile station when the mobile station is one of at least one registered mobile station, the communication method comprising:

storing by the mobile station in case that the mobile station is one of at least one registered mobile station, a first identifier of the first wireless base station and a second identifier of the second wireless base station;

transmitting by the mobile station in case that the mobile station is one of at least one registered mobile station, first information to the second wireless base station when a third identifier of serving base station is other than the first identifier and the second identifier, and transmitting second information to the second wireless base station when the third identifier is the first identifier or the second identifier; and reducing or stopping a transmitting power by the second wireless base station, when the second wireless base station detects all of the at least one registered mobile station being out of the first cell and the second cell based on the first information or the second information.

* * * * *